March 18, 1969 R. A. HIGONNET ET AL 3,433,404
TYPE COMPOSING APPARATUS
Original Filed April 11, 1955 Sheet 3 of 8
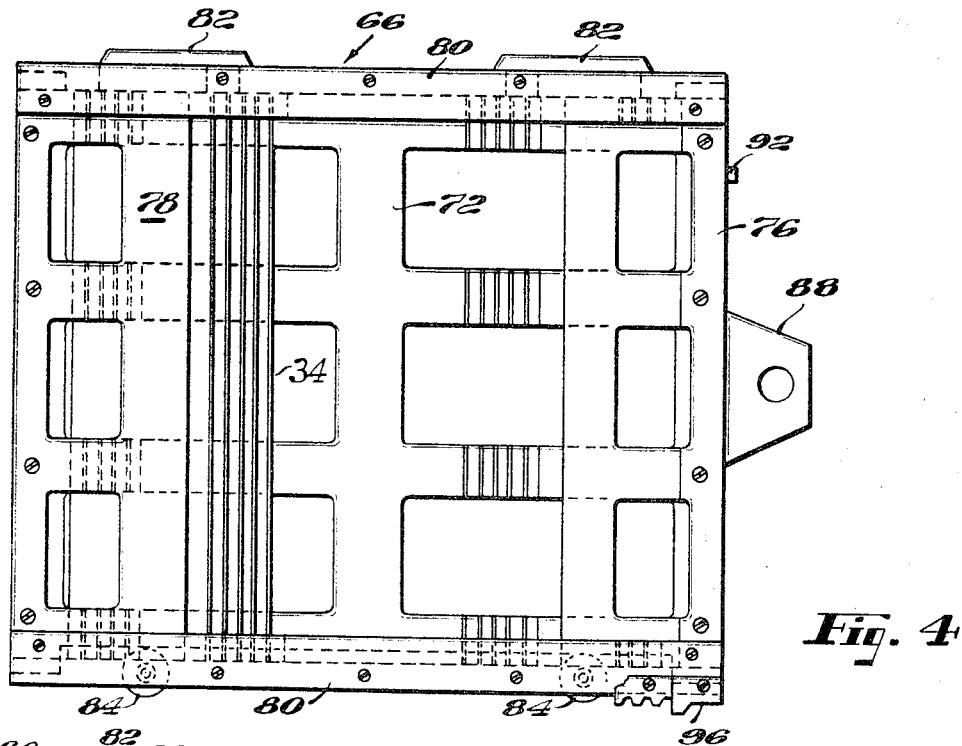
Fig. 4
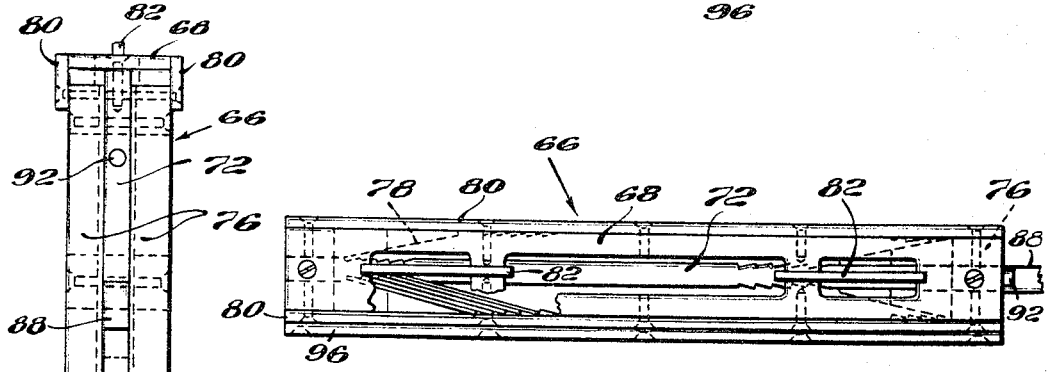
Fig. 5
Fig. 6
INVENTORS
RENE A. HIGONNET
LOUIS M. MOYROUD
BY
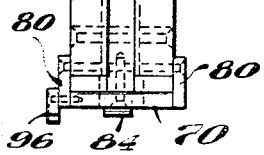
ATTORNEY

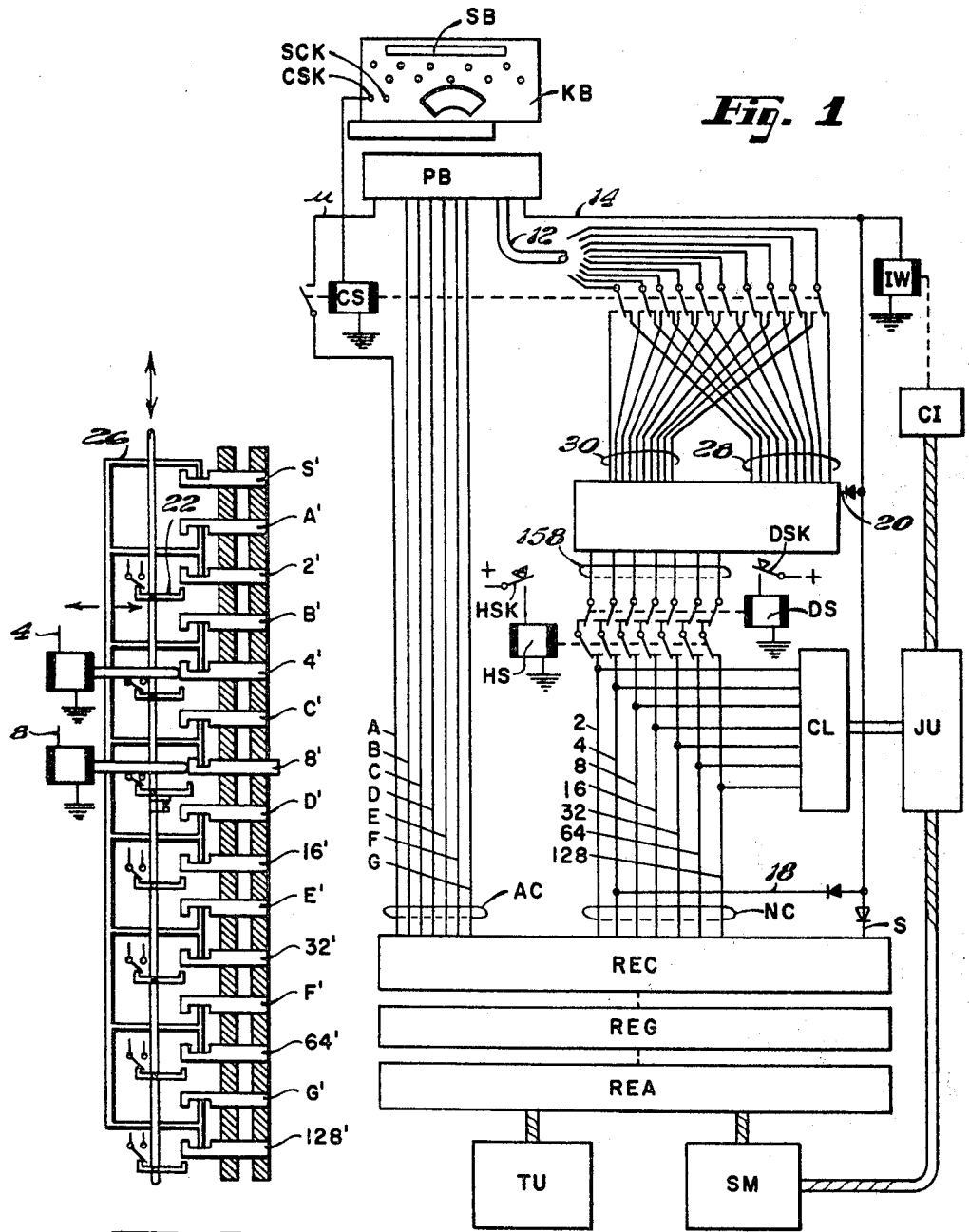

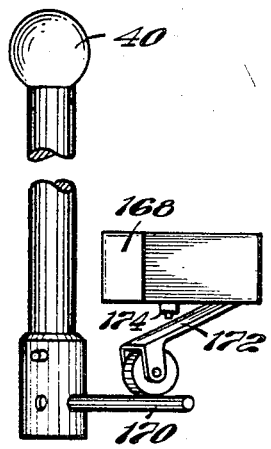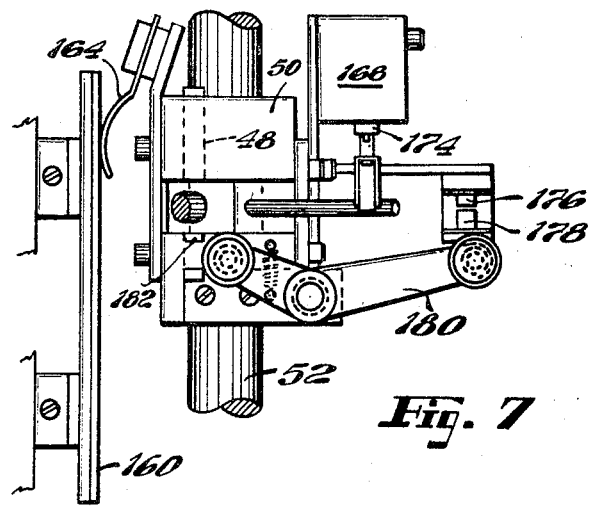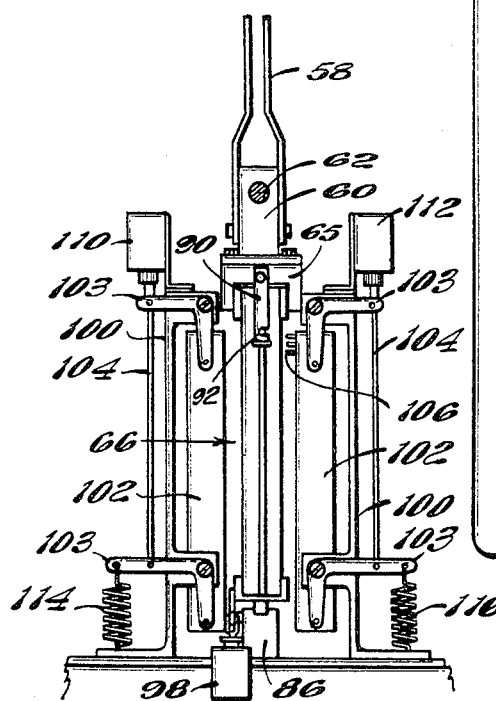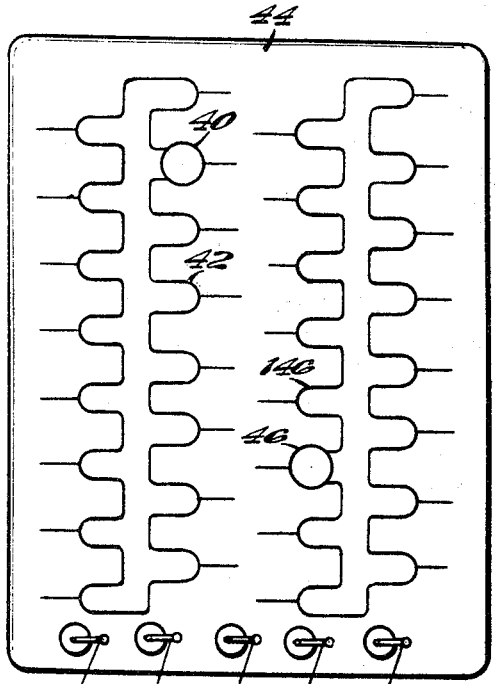

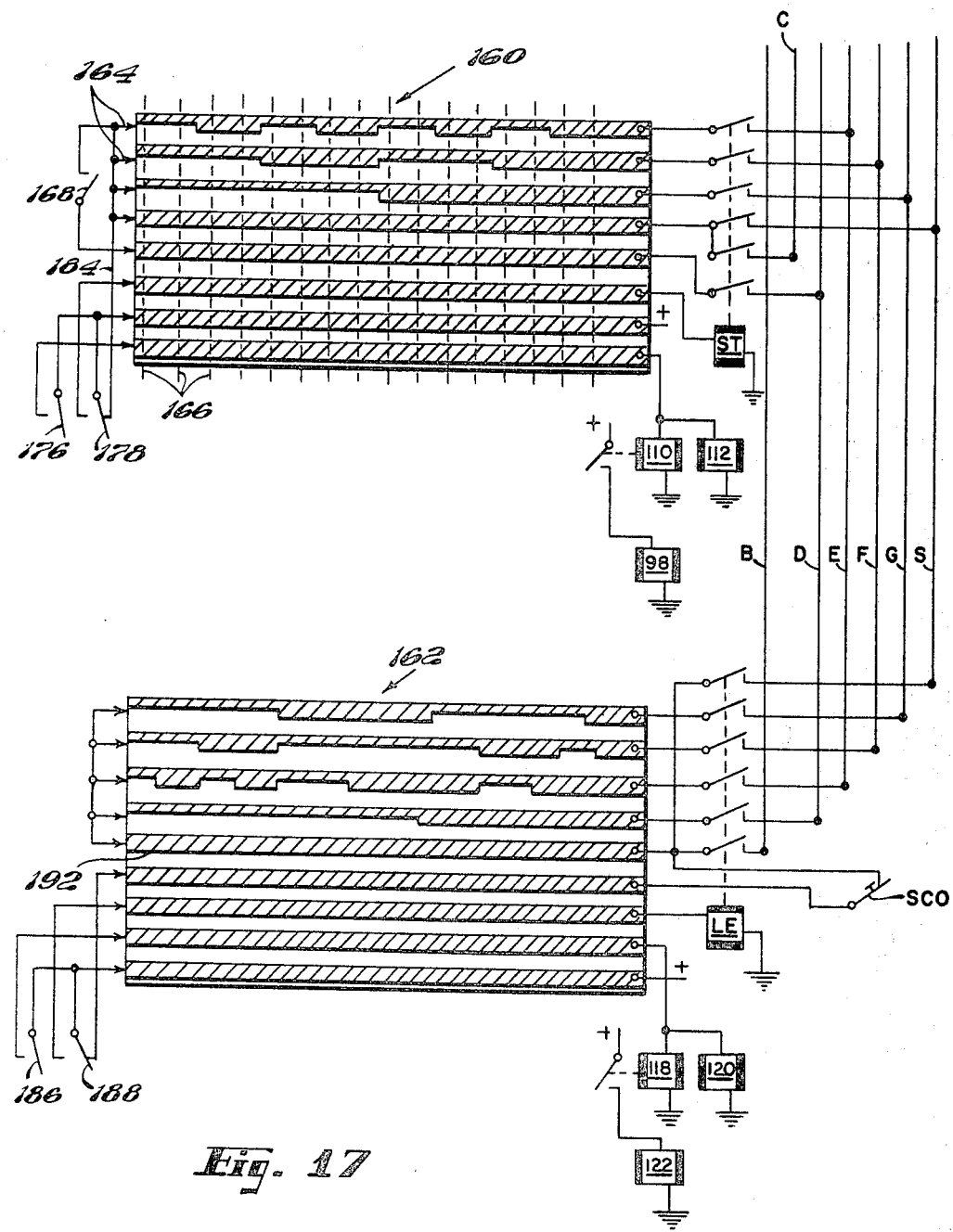

United States Patent Office 3,433,404
Patented Mar. 18, 1969

3,433,404
TYPE COMPOSING APPARATUS
Rene A. Higonnet, Cambridge, and Louis M. Moyroud, West Medford, Mass. (both % Photon Inc., 355 Middlesex Ave., Wilmington, Mass. 01887)
Application June 9, 1958, Ser. No. 741,209, now Patent No. 3,332,617, which is a continuation of application Ser. No. 500,397, Apr. 11, 1955, and a continuation-in-part of application Ser. No. 770,320, Aug. 23, 1947, now Patent No. 2,790,362. Divided and this application Nov. 8, 1966, Ser. No. 592,910
Claims priority, application Great Britain, Apr. 21, 1954, 11,539/54
U.S. Cl. 234—5     4 Claims
Int. Cl. G06k 15/00

ABSTRACT OF THE DISCLOSURE

A character selection device for composing typographic characters that vary in width is disclosed. This device contains width cards or plugs that effectively store the width associated with each selectable character. The width cards or plugs generate a signal indicative of the character width each time a character is selected.

---

This application is a division of our copending application Ser. No. 741,209, filed June 9, 1958, now Patent No. 3,332,617, which is a continuation of application Ser. No. 500,397, filed Apr. 11, 1955, now abandoned, and a continuation-in-part of Ser. No. 770,320, filed Aug. 23, 1947, now Patent No. 2,790,362, which was copending with Ser. No. 500,397.

The present invention relates generally to type composing apparatus. More particularly, it is concerned with apparatus for storing information corresponding to the selected characters in a line of type for subsequent transcription in controlled spaced relationship.

The characters are preferably stored in a suitable register in full lines, rather than being transcribed immediately upon selection at the keyboard. This permits justification of the lines, whereby the right-hand margins are aligned; and it also permits correction of erroneously selected characters. Correction is made possible by permitting the operator to see the characters corresponding to the information stored in the register after each line has been composed, and to erase and correct any erroneous information in the register before transcription has begun.

It is well known that type composition requires great versatility in selection, not only of the characters and their cases, but also of the character styles, sizes and set widths. Moreover, the various characters of an alphabet are of different widths relative to one another. It is necessary to provide a memory facility of sufficient capacity to store all of this information as well as additional information, particularly with reference to special spacing requirements such as are commonly met in the printing art.

The principal object of this invention is to reorganize and simplify the means for transmitting information from the keyboard to the registering device. For present purposes, the specific form of register is unimportant, but it is preferably of the type having, for each selected character, a number of discrete register positions, each position being adapted to indicate one or the other of two possible conditions. This function may be performed, for example, by the familiar Lanston Monotype punched tape as used in the composing machine of U.S. Patent to Highton No. 2,351,126, but is preferably performed by a mechanical register of the form described in U.S. Patent to Higonnet Moyroud, No. 2,690,249.

The apparatus hitherto used for entering information into the register has been found unduly complicated. This increases the manufacturing cost, maintenance requirements and likelihood of errors in operation. Further objects of the invention are to reduce the foregoing factors as far as possible consistently with the requirements of versatility in selection.

Having in view the above objects as well as others which will be appreciated from the following discussion, a principal feature of the invention resides in providing a number of selectable multiple-circuit elements, and means under the control of the character keys and other keys actuated by the operator for connecting selected circuits of these elements with the register.

These multiple-circuit elements are used principally to perform two functions. The first function is to translate circuits corresponding to each of the several distinct character keys into a relatively smaller number of circuits each corresponding to one of the possible "relative width values." This latter term is defined as the ratio of the space occupied by a given character in a given style, size and set width to the space occupied by a given portion of a reference character such as the "m" in the same style, size and set width. Thus, one-fifteenth part of the width of the character "m" may be selected as a reference unit. On this basis, the "i" may have a relative width value of 5½, the "c" may have the value 7, and so on.

The second function of the multiple-circuit elements is to translate the relative width values thus obtained into binary numbers representing the products of such values and the selected "set widths." This latter term is a factor which takes into account the size of the selected alphabet and the desired closeness of adjacent characters in the composed line.

Thus, through the two functions described, there is provided a circuit adapted to represent, for any selected character, a binary number proportional to the space which the character is to occupy in the line, measured for example in convenient fractions of an inch or centimeter. This binary number is entered into the register. Additional information indicating the style and set is also entered into the register under the control of the keyboard and associated controls, as hereinafter described.

Other features of the invention reside in certain structures, arrangements and modes of operation which will become apparent from the description to follow.

In the drawings:
FIG. 1 is a block diagram schematically representing an entire type composing machine;
FIG. 2 is a schematic representation of a register;
FIG. 3 is a side elevation of mechanism for selection of multiple-circuit elements;
FIGS. 4, 5 and 6 are side, top and end elevations, respectively, of a support for a number of multiple-circuit elements or "cards";
FIG. 7 is a top elevation of a multiple-circuit element change lever and associated parts;
FIG. 8 is a detail view of part of FIG. 7;
FIG. 9 is an end elevation taken on line 9—9 of FIG. 3;
FIG. 10 is a plan view of the multiple-circuit change lever panel;

FIG. 17 is a circuit diagram of switching means associated with the operation of the multiple-circuit change levers.

*Block diagram*

Figure 3:
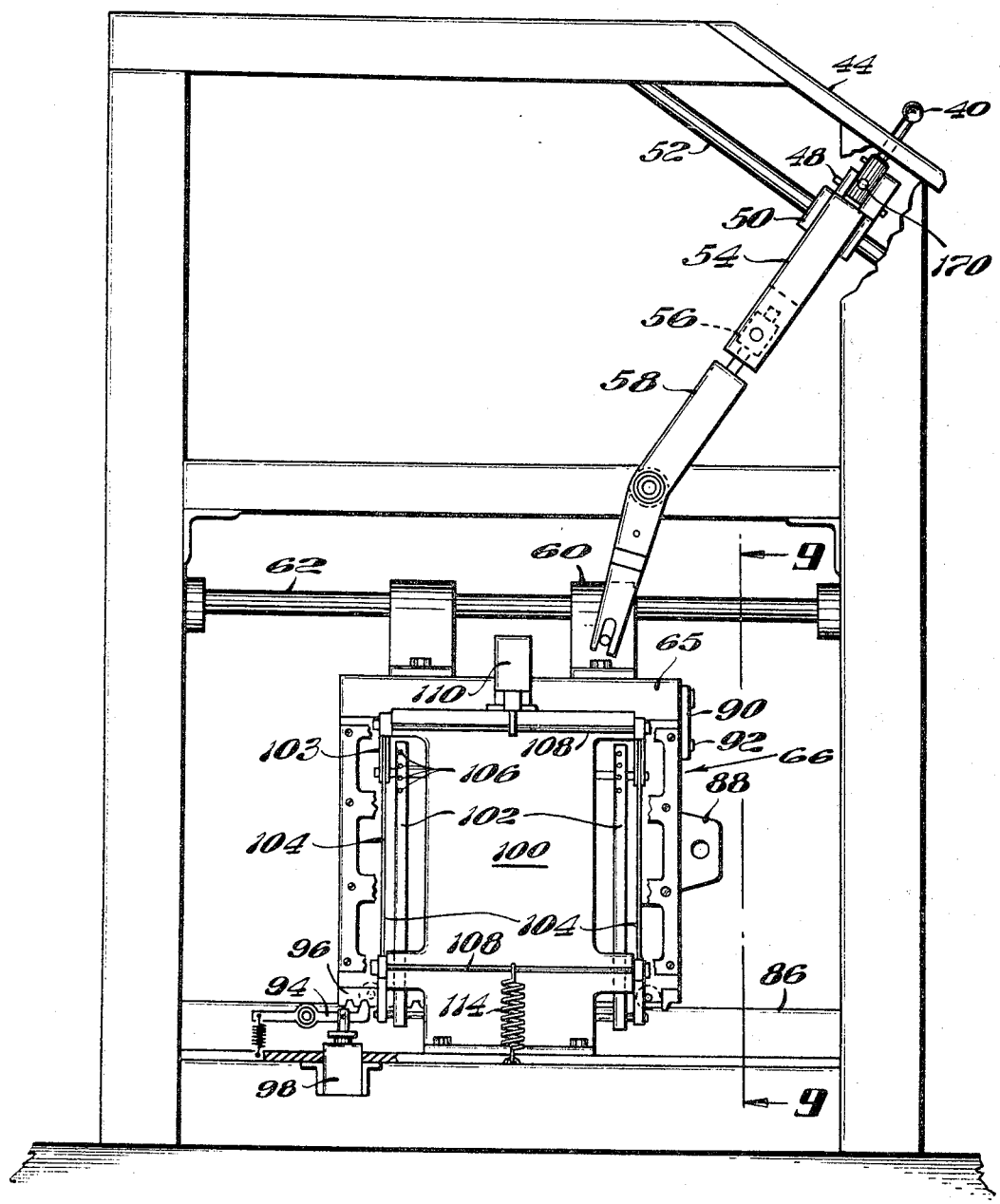

FIG. 1 is a block diagram representing an entire type composing machine according to the invention. There is provided the usual keyboard unit KB having a key for each selected character (there being forty-five keys of this type in the illustrated embodiment), a space bar SB, and a number of special keys. The keyboard unit is preferably adapted to provide a typed copy of the selected characters in the same manner as an ordinary typewriter. By this means, the operator may check the characters after each line of typing to detect any errors.

In addition, the keyboard is adapted to actuate a permutation bar unit PB, which may be of the familiar form used in Teletype apparatus. The unit PB has four output circuits. The first circuit is constituted by a universal wire $u$, which receives a temporary electrical impulse whenever any character key or the space bar is depressed. The second circuit is constituted by six wires B to G, inclusive, forming with a wire A an alphabetical code group AC. A distinct combination of these wires is similarly energized whenever any one of the character keys is depressed. The third circuit is constituted by a number of wires forming a cable 12. There is one wire in this cable for every character key (forty-five in the illustrated embodiment), and each wire is energized only when the corresponding key is depressed. The fourth circuit is constituted by a single wire 14 which is energized whenever the space bar is depressed.

The keyboard or an adjacent part of the machine accessible to the operator is also provided with a number of other keys. These include a case shift key CSK, by which the universal wire $u$ is connected to the alphabetical code wire A through energization of a case shift relay CS. A half-set key HSK is depressed to energize a half-set relay HS, thereby reducing the set width of any character to half its normal value. Similarly, a double-set key DSK and a relay DS are operative to double the set width of any character.

The alphabetical code group AC of seven wires is connected directly with a recording unit REC, which transfers information to the register REG a character at a time. The unit REC may include a number of punches for a paper tape, one for each entry wire, but it preferably includes the solenoid-actuated hammers of the register of said U.S. Patent 2,690,249, as schematically shown in FIG. 2. In FIG. 2 there is shown a frame having a number of depressible pins in a column. There are a number of such columns arranged one next to the other. Each pin has two possible positions. According to the present invention, there are preferably fifteen pins S', A', 2', B', 4', C', 8', D', 16', E', 32', F', 64', G' and 128', arranged in a column to represent each character in a line. The pins are each depressed by a solenoid-actuated hammer, as illustrated for a pair of wires 4 and 8.

In addition to the alphabetical code group AC, there is a numerical code group NC leading to the recording unit. This group is constituted by seven wires, 2, 4, 8, 16, 32, 64 and 128, each wire having a binary order represented by its reference number. This code group is used to represent the width of each character, taking into account its case, relative width value and set. Finally, there is a single entry wire S which is energized with a wire 18 through the wire 14 to designate a word space entry in the register. Also, by means hereinafter described a wire 20 which is energized at the same time transmits a width value indirectly (see FIG. 16) to the numerical code group NC, this width value being the minimum value assigned to each word space.

The numerical code group NC is also connected with a line counter CL, which is preferably a binary relay accumulator of the type described in U.S. patent to Higonnet and Moyroud, No. 2,682,814. This counter accumulates the widths of the selected characters in a line, whereby it is possible to determine the additional increments or spaces that must be added to the minimum word spaces or, if desired, between each pair of adjacent characters, to justify the line.

The determination of justification increment sizes is made in a suitable justifier JU, which may be, for example, of the type described in said U.S. Patent 2,682,814. To this end, an interword (word space) counter CI is also connected with the justifier. The counter CI may be a stepping switch as described in the last-mentioned patent, which steps one position each time the space bar is depressed through operation of an interword relay IW by the wire 14.

When an entire line of character has been registered, the operator may read the unjustified copy produced at the keyboard to detect any errors therein. If there are no errors, a suitable carriage return key (not shown) may be depressed. This key returns the platen of the typing unit and initiates the transcription of the stored line in the usual manner. At any time before this key is depressed, the operator may return the platen of the typing unit to the position of any character to be corrected, and erase and correct the corresponding information in the register REG and the line counter CL. This is made possible in a mechanical register by a mechanical connection between the recording unit REG and the platen of the typing unit, as fully described in said U.S. Patents 2,690,249 and 2,682,814. According to these patents, a group of contact-closing sensing levers 22 are lifted to detect the binary width value of the erroneous character, and an erasing mechanism 26 is then moved to retract the pins.

After the line has been composed and corrected, the information in the register is read by a suitable reading device REA, a character at a time, and transferred to a transcription unit TU and a spacing mechanism SM. Normally, the units TU and SM operate in alternate fashion, with the unit TU first transcribing a given character, for example by projection upon a sensitized film, and the unit SM then moving the film a distance corresponding to the width of the particular character to bring the film into position for the next succeeding character. As will be obvious, the mechanism SM is also controlled by the justifier JU.

In the case of a tape register, the reading unit may be of the pneumatic type as shown in said U.S. Patent 2,351,126, or of the electrical reading-brush type. In the case of a pin register, the reading unit may be constructed as shown in said U.S. Patents 2,690,249 and 2,682,814, FIG. 6. This latter patent also discloses a suitable photographic transscription unit. Suitable spacing mechanisms are preferably of the form utilizing a binary input to produce linear movements in a carriage, which are directly proportional to the width values represented, as in the copending U.S. application of Higonnet nad Moyroud, Ser. No. 375,653, filed Aug. 21, 1953.

The means whereby the cable 12, with its wires corresponding to each of the charatcer keys, is connected with the numerical code group NC of seven binary wires leading to the recording unit REC, are hereinafter described. These means principally include two groups of selectable multiple-circuit elements corresponding, respectively, to the style and set width of the characters.

Circuit element selection

Referring to FIG. 1, there are two cables 28 and 30, of which has as many wires as there are wires in the cable 12. (For convenience only ten wires are shown, although forty-five are used in the preferred embodiment.) These cables are connected through transfer contacts of the case shift relay CS. The cable 28 corresponds to the lower case and the cable 30 to the upper case. These cables appear in FIG. 15 where they are shown connected to four multiple circuit elements 33, 34, 36 and 38. The mechanical structure and method of selection of these elements will be understood from FIGS. 3 to 14, inclusive.

FIG. 3 shows a side elevation of a card-selection mechanism which is manipulated by a style change lever 40 protruding through a grille 42 in a plate 44 (FIG. 10). There are two such mechanisms, the other being manipulated by a set change lever 46; but only one mechanism is described since they are substantially identical.

The lever 40 may be rotated to the left or right as viewed in FIG. 10, about a pivot 48 (FIGS. 3 and 7). The pivot is secured between extensions of a sleeve member 50 supported upon a rod 52. The lever may also be moved upward or downward as viewed in FIG. 10 to cause movement of the sleeve 50 along the rod. An arm 54 secured to the sleeve transmits the motion, through a block 56 pivoted on the arm, to an extension of a lever 58 having a fixed pivot, the lever being slidably received in the block 56.

The lever 58 is engaged with a block 60 (FIGS. 3 and 9) slidably supported on a rod 62 secured to the frame of the machine. The block 60 is bolted to a card carriage 65 of inverted U-shape, into which a replaceable card support 66 may be placed and secured.

The card support is shown in detail in FIGS. 4, 5 and 6. It consists of top and bottom plates 68 and 70 secured to a vertically notched card separator 72, a pair of beveled members 76 secured to the card separator at the forward end of the support, and a pair of beveled members 78 similarly secured to the separator at the rear of the support and having sloping surfaces parallel with those of the members 76. The members 76 and 78 and the notched separator 72 provide means for supporting a number of multiple-circuit elements in the form of flat cards like that of FIG. 13 in four groups, two on each side, with the cards in each group lying in parallel, slightly overlapping relationship. The cards are held in place at their narrow edges by retainer plates 80.

The top plate 68 carries slides 82 which fit within a groove in the lower surface of the carriage 65. The bottom plate is relieved to receive rollers 84 pivoted to the plates 80, the rollers being adapted to move along a groove in a frame member 86. The separator has a handle 88 for easy handling of the card support. The support with cards assembled in place is assembled to the machine by simply lifting a latch 90 pivoted to the carriage 65, inserting the support with its slides 82 in the groove of the carriage and its rollers 84 in the groove in the frame member 86, and closing the latch upon a post 92 secured to the separator 72. It is also necessary to depress a spring-loaded latch 94 so that it is free of a rack 96 secured to the card support. A carriage disengaging magnet 98 (FIGS. 3 and 17) may also be energized to depress the latch.

The rack and latch are used to position the card support accurately in relation to a pair of fixed brush supports 100 (FIGS. 3 and 9), each support having two columns 102 of individually spring-mounted brushes and each column being mounted upon a pair of bell-crank levers 103 attached by vertical rods 104, whereby the brushes 106 may be moved into contact with a selected card by rotation of said levers. The two columns of brushes on each side of the card support are moved together through interconnecting horizontal rods 108 by a magnet 110 or 112 (FIGS 3, 9 and 17), and are normally urged into contact with the cards by springs 114 or 116. The magnets 110 and 112 are parallel-connected (FIG. 17) to permit all four contacts to move in unison. It will be obvious that mechanisms other than the bell-crank levers may be used to move the brushes. For example, well-known mechanisms adapted to produce straight line motion of the brushes may be employed.

The magnets 118, 120 and 122 in FIG. 17 correspond to the magnets 110, 112 and 98, respectively, and are associated with the similar mechanism actuated by the set change lever 46.

Figure 11:
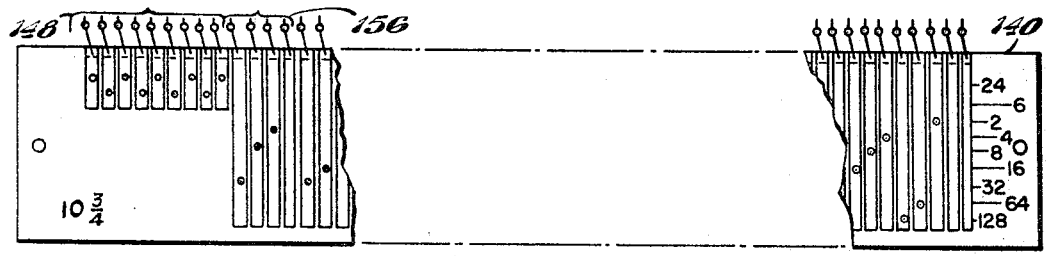
FIGS. 11 and 12 are views of the two sides of a representative multiple-circuit element or "card" for multiplication of the relative width value of each character entry by a given set value.
Figure 12:
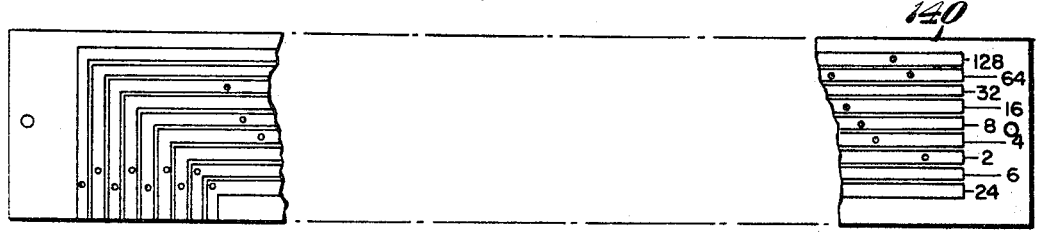
Figure 13:
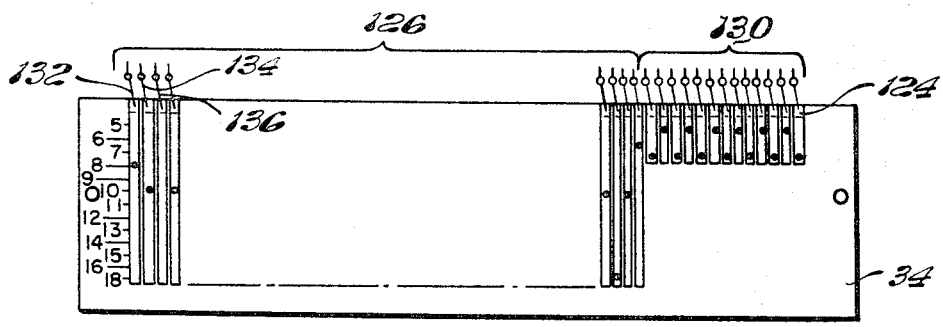
FIGS. 13 and 14 are similar views of a representative multiple-circuit element or "card" for selecting a relative width value appropriate to a given style for each character entry.
Figure 14:
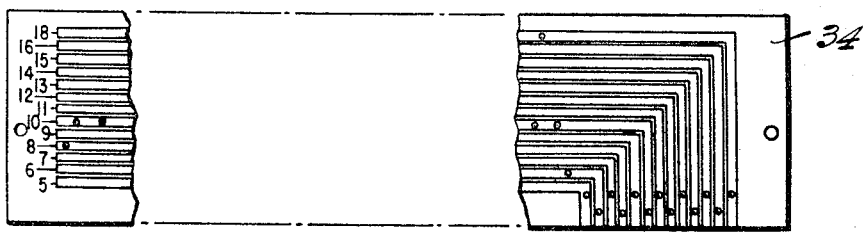

The construction of the individual cards in the style change carriage 65 is illustrated in FIGS. 13 and 14. The cards in the set change carriage are similarly constructed as shown in FIGS. 11 and 12. The body of each card preferably consists of a plastic or plastic-impregnated insulating material having a thin layer of copper on both sides. The copper is selectively etched away on each side to form the illustrated patterns of mutually insulated conducting lines. After etching, a pattern of holes is punched through the card, and the remaining metal is plated to improve its conductivity and produce a metallic connection through each hole between a strip on one side and a strip on the other. Also, a margin 124 on each card is preferably plated with a highly corrosion-resistant metal such as gold to insure good contact with the brushes.

Figure 15:
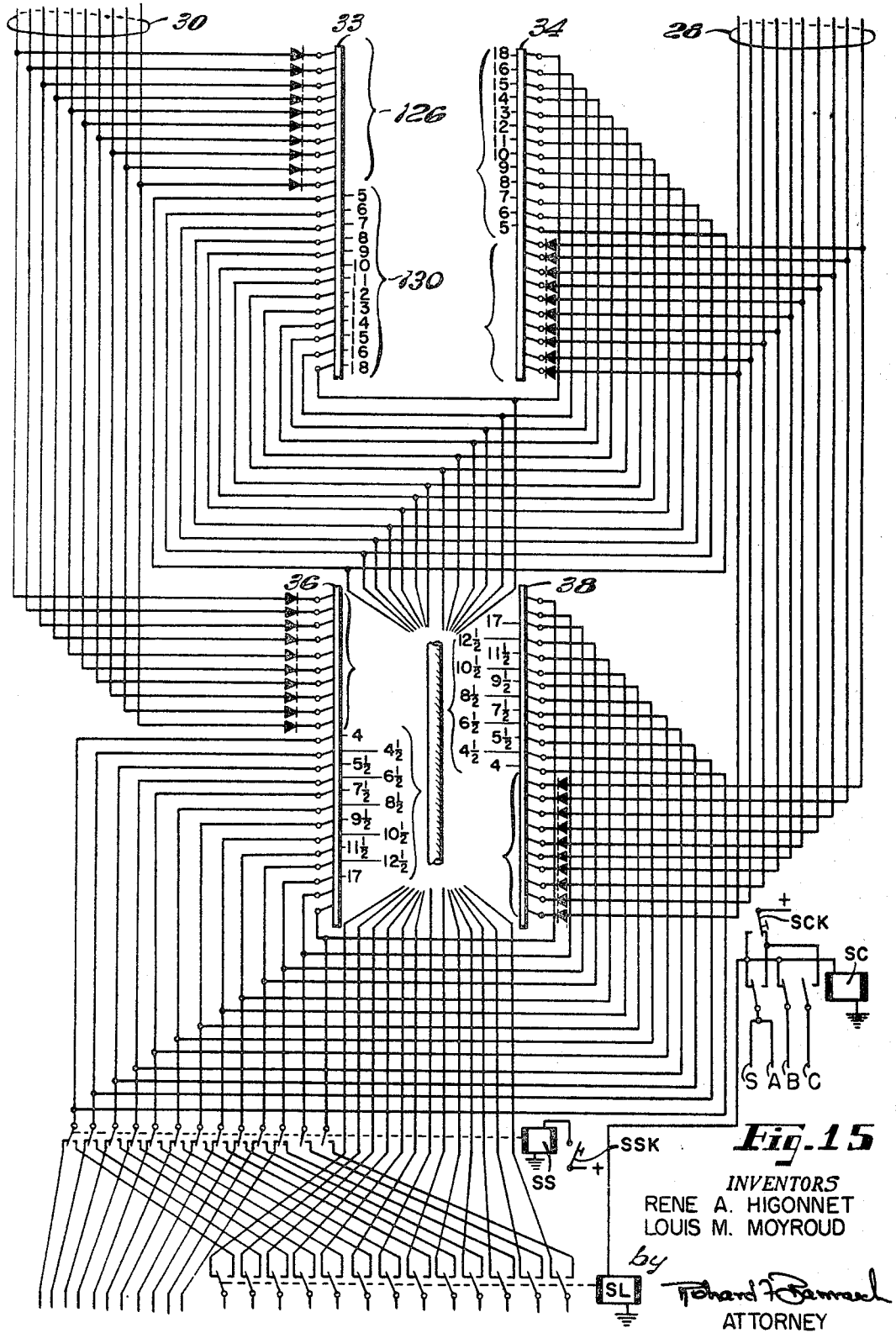
FIG. 15 is a circuit diagram of connections to elements like that of FIGS. 13 and 14.

The brushes touching each card are divided into two groups, an input group 126 of 45 brushes, represented in FIG. 15 as 10 brushes for simplicity, and an output group 130 of thirteen brushes. Thus, an input brush corresponding to a particular typed character may be connected through the card to a corresponding output brush designating a particular relative width valve.

It will be seen that at any moment the four columns of brushes are in contact with four cards, one card in each of the four groups in the support 66. FIG. 15 schematically represents these cards in plan view, showing the electrical connections. There are as many cards in each group as there are selectable styles or lever positions in the grille 42 (sixteen as illustrated). Through the case shift relay CS (FIG. 1), the operator transfers the connections of the cable 12 either to the right-hand pair of cards 34 and 38 on one side of the support 66 representing lower case characters, or to the left-hand pair of cards 33 and 36 on the other side of the support representing upper case characters.

Each of the input wires connects with an input brush on each of the two cards corresponding to the selected style and case. However, it is arranged that only one of the brushes will find a completed circuit. If the particular character is one which has a relative width value of 5, 6, 7, 8, 9, 10, 11, 12, 13, 14, 15, 16, or 18 in the selected style, the appropriate circuit is completed through the card 33 (upper case) or 34 (lower case); if its relative width value is 4, 4½, 5½, 6½, 7½, 8½, 9½, 10½, 11½, 12½, or 17, the appropriate circuit is completed through the card 36 (upper case) or 38 (lower case).

For example, the card 34 in FIGS. 13 and 14 represents the lower case characters in the Baskerville Roman style which have relative width value outputs as indicated in FIG. 15 for this card. It will be seen that the character "a" represented by a brush 132 has the output value 8, the "b" represented by a brush 134 has the value 10, and the "c" represented by a brush 136 has no circuit. (The value for the "c" is 7½, and the corresponding connection is made on the card 38.)

The output circuits for the style cards are shown in FIG. 15. These outputs pass through a special style change relay SS actuated through a special style change key SSK and a special style transfer relay SL, to twenty-four output wires at the bottom of FIG. 15. These output wires, identified with their appropriate relative width values, appear at the top of FIG. 16 which shows the connections to set cards 138, 140, 142 and 144 on the carriage manipulated by the lever 46 (FIG. 10).

These connections are made through contacts of a set range relay SR actuated through a key SRK. When this key is open, the operator has a selection of set values corresponding to slots in the grille 146, as follows: 5, 5½, 6, 6½, 7, 7½, 8, 8½, 9, 9½, 10, 10½, 11, 11½, 12 and 14. When the key is closed, the set values of the slots are changed, respectively, to the following values: 5¼, 5¾, 6¼, 6¾, 7¼, 7¾, 8¼, 8¾, 9¼, 9¾, 10¼, 10¾ 11¼, 11¾, 12½ and 13. The values listed above are preferably displayed on the respective grille positions, and are obtained by moving the lever 46 to the desired position. A value equal to twice the selected value may also be obtained with the lever at any position by closing the double-set key DSK (FIG. 1), and half the selected value is obtained by closing the half-set key HSK.

With the key SRK open the twenty-four inputs to set cards are connected with the cards 138 and 142 on one side of the set card support, these cards corresponding to the selected set in the first of the above set ranges; and with the key close identical connections (not shown) are made with the cards 140 and 144 on the other side corresponding to the second set range.

It will be observed that there are sixteen set cards in each of the four card groups. These cards are constructed as shown in FIGS. 11 and 12, with forty-nine input brushes and nine output brushes 148. The input wires are divided between the two groups of input brushes on each side of the card support as shown in the drawing. The card 140 shown in FIGS. 11 and 12, for example, corresponds to special set "10¾" and is adapted to receive relative width value inputs 4, 4½, 5, 5½, 6, 6½, 7, 7½, 8, 8½, 9 and 18.

Figure 16:
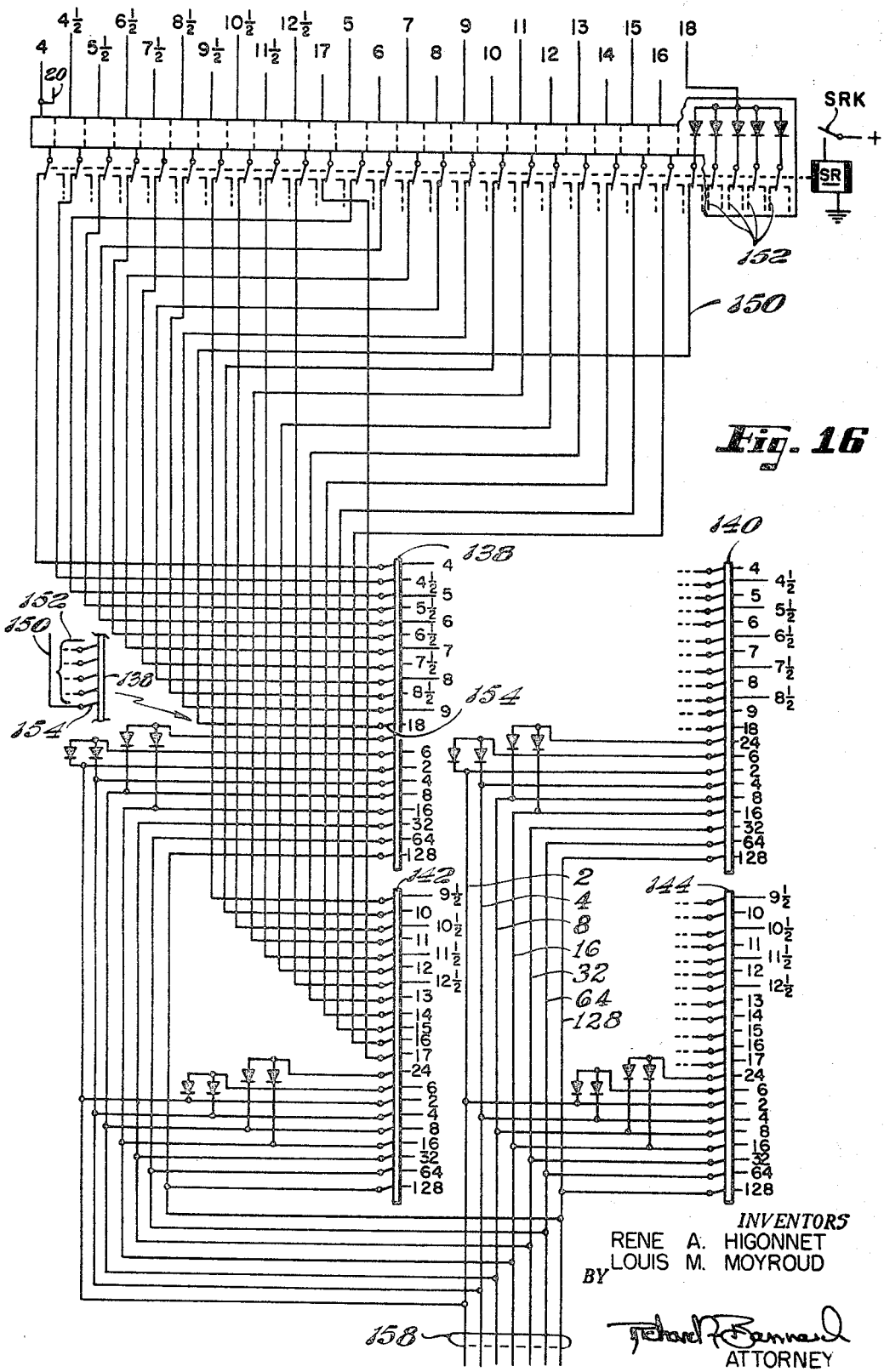
FIG. 16 is a circuit diagram of connections to elements like that of FIGS. 11 and 12.

Each of the twenty-four input wires at the top of FIG. 16 is connected to four rectifiers, with each rectifier leading to a separate blade of the relay SR, except in the cases of the inputs 17 and 18 which have five rectifiers each. For simplicity in the drawing, only the rectifiers for the input 18 are shown. Although only a single wire 150 for this input is shown connected to the card 138, there are four other wires 152 which are connected with adjacent input brushes. Thus, to input 18 actually accounts for five input brushes, represented in the drawing by a single brush 154. Similarly, each of the remaining input brushes shown in the drawing represents four brushes, making a total of forty-nine for each card.

The output brushes 148 (FIG. 11) have the values, from left to right, of 24, 6, 2, 4, 8, 16, 32, 64 and 128. The combination of these brushes which is energized represents the product of the relative width value input and to set value which the selected card represents. For example, the input 4 is represented by an impulse appearing on four brushes 156. For a "10¾" set, the exact product is 43. It will be seen from the drawing that the binary outputs 32, 8, and 4 are energized, representing a total of 44, this being the nearest value to the exact product that can be represented. In some cases the nonbinary output brushes 24 and 6 are also energized. These are connected through rectifiers to the respective binary outputs as shown in FIG. 16.

The binary outputs of all four set cards are connected to a cable 158 shown in FIG. 1. This cable is connected through transfer contacts of the double-set and half-set relays DS and HS, to the cable NC and the counter CL.

It will be appreciated from the foregoing that depression of the space bar SB sends an impulse to the wire 20 (FIGS. 1 and 16), where it enters the selected set card as a relative width value of 4, and is multiplied by the same set value as the characters being composed. Thus, in the case of a set width of "10¾," the width entry in the register through the set card for a word space is 44.

With respect to the word space entries, it will be further noted that the wire 4 is energized directly through the wire 18 in every case, irrespective of the set value, and to this extent there will be a small but insignificant variation in some cases betwen the space represented by the set card output circuit and that represented in the register.

*Special codes*

It has been previously explained that each of the forty-five keys on the keyboard may be used to make an entry in the register by energizing a distinct combination of the wires B to G. Thus, the letters "F" and "f" may be represented by the combination of "EF," plus some combination of the binary width values 2 to 128 depending on the particular case, style and set width, for example. Also, an upper case character is distinguished from the corresponding lower case character by the code entry "A" in the register. Similarly, a word space appears as the combination "S," 4, and some combination of the binary width values 2 to 128, depending on the selected set width. Other code entries hereinafter described are made in the register to represent the desired style and size of each character selected and special style changes which may be effected without manipulation of the lever 40.

The code entries representing the styles and sizes of characters are made from coded connector plates 160 and 162 (FIG. 17), respectively. These are fixed plates constructed of insulating material and having plated thereon coded conducting strips represented by the shaded areas. The plate 160 is mounted adjacent the sleeve 50 of the style change mechanism as shown in FIG. 7. The plate 162 is similarly mounted adjacent the set change mechanism, not shown. Eight brushes 164 supported on the sleeve 50 are arranged to move along the plate to any one of sixteen positions 166, which they occupy when the lever 40 is engaged in the various positions of the grille 42. Through contacts of a slow-releasing style code relay ST, the six uppermost conducting strips are connected with the wires C, D, E, F, G and S leading to the register.

As indicated below, the wires S and C are energized whenever any style change occurs. Each two adjacent positions of the lever 40 (one on each side of the grille) will cause energization of a common combination of the wires E, F and G, as indicated in FIG. 17. The right-hand position is distinguished from the left-hand position of each such pair by energization of the wire D through closure of a switch 168 (FIGS. 7, 8 and 17), when the lever is moved to the right. (There is no corresponding switch in the set change mechanism; in all other respects the mechanisms are identical.) Closure of the switch 168 is effected by an arm 170 secured to the lever 40, which bears upon a lever 172 pressing upon a contact actuating button 174.

Also associated with the plate 160 are transfer contacts 176 and 178 (FIGS. 7 and 17) supported on the sleeve 50, which are actuated through a lever 180 pivoted on the sleeve 50 by a button 182 protruding from a side of the lever 40. This button actuates the contacts when the lever 40 is in the vertical ("neutral") position, but does not actuate them when the lever is engaged in a selected position on either side of the grille.

Code entries designating the style are not made in the register except when a change of style is to be made. At such time, a style change code is entered in the next position of the register after the last character of the old style, as follows: The lever 40 is moved to "neutral," actuating the contacts 176 and 178 to connect the battery to the brush disengaging magnets 110 and 112 and to the slow-releasing style code relay ST. The carriage disengaging magnet 98 is also energized by closure of contacts associated with the magnet 110. The lever is then engaged in the new position, returning the contacts 176 and 178 to the position shown, thus deenergizing the magnets 110, 112 and 98 to lock the card carriage accurately in the new position and to reengage the brushes. The removal of the battery from the relay ST does not cause its immediate release, but permits connection of the battery for a brief interval with the register through a wire 184 the brushes in contact with the code strips, the appropriate code strips, and the contacts of the relay ST.

In a very similar manner, a character size code is entered in the register whenever a change in the point size or magnification of the composed characters occurs. This is accomplished automatically by manipulation of the set change lever 46. Thus, a size code entry may be described as follows: The lever 40 is moved to "neutral," actuating contacts 186 and 188 to connect the battery to the brush disengaging magnets 118 and 120 and to a slow-releasing set code relay LE. The carriage disengaging magnet 122 is also energized by operation of the magnet 118. The lever is then engaged in the new position, returning the contacts 186 and 188 to the positions shown, thus de-energizing the magnets 118, 120 and 122. The slow release of the relay LE permits brief connection of the battery with the register through a "set change only" switch SCO, the connection being made directly to the common wires S and B, and indirectly through a strip 192 to the four uppermost brushes and the appropriate combination of the code strips to a combination of the wires D, E, F, and G.

The code strips are so arranged that each of the available character sizes which may be represented in the register is assigned to one or more of the set widths which may be selected by the operator. Thus, the code for a particular size is automatically entered in the register each time the set is changed to one of its assigned set widths, in the manner previously described. However, occasionally it is desired to change the set without changing the size. This is accomplished as follows: First the switch SCO is opened and the lever moved into the new set position. After it has reached this position and the relay LE has released, the switch SCO is reclosed. It will be apparent that this prevents the size code for the new set from reaching the register.

*Rapid style shift*

As stated before under the heading "Circuit Element Selection," the output wires from the style cards (FIG. 15) are connected with the set cards through contacts of a special style change relay SS and a special style transfer relay SL. These relays are energized only under special circumstances when it is desired to effect a rapid style change, for example from Roman to Italic, by means of a key in much the same manner as with a case shift, and without moving the lever 40.

If such a shift between two selected styles is desired, they must be of such design that the relative width value of every character in both styles falls within the range 5, 6, 7, 8, 9, 10, 11, 12, 13, 14, 15, 16 and 18. It will be appreciated that if this condition is met, one of the styles may be represented in its entirety by only two cards, such as the card 33 for the upper case characters and the card 34 for the lower case characters. No connections for this style will be made at the card positions 36 and 38 since the relative width inputs normally assigned to these cards are not used.

According to the present invention, instead of providing cards at the positions 36 and 38 without connections to their outputs, a pair of style cards like the cards 33 and 34 are used. These are adapted for the input values 5, 6, 7, 8, 9, 10, 11, 12, 13, 14, 15, 16 and 18 and correspond to a second style. The transfer from the style represented by the cards 33 and 34 to the style represented by the special cards in the positions 36 and 38 is simply made by a switch SCK as follows:

Upon the initiation of a composition using these two styles, the key SSK is closed. This energizes the relay SS, which remains closed until the composition is finished, transferring the outputs of the cards 36 and 38 to contacts of the relay SL, as shown. With the key SCK normally in the position shown, the relay SL is unenergized, and only the outputs of the cards 33 and 34 corresponding to one of the styles finds a circuit to the set cards. To effect the style shift, the key SCK is operated, thus energizing the relay SL and transferring the outputs of the cards 36 and 38 to the set cards.

A special code is sent to the register when such a shift is effected. As shown in FIG. 15, actuation of the key energizes the wires S, A and B and connects the battery to a slow-acting relay SC which then opens the circuit to the register. The relay SC remains energized until the style is shifted back by moving the key SCK to the position shown. The battery then finds a temporary circuit to the wires S, A and C, which opens when the relay SC releases.

It will be appreciated that the foregoing feature doubles the number of styles which may be selected by a given position of the lever 40 in the grille 42.

It will be seen, therefore, that the preferred embodiment of the invention heretofore described comprises a novel apparatus for entry of certain information which is necessary in type composition into a register where it is stored in the form of discrete code combinations adapted to be sensed consecutively during transcription of the characters, to ascertain the identity of each character, its case, style, size and the width to be allocated to it in the line. This apparatus includes a number of selectable multiple-circuit elements, or cards each representing a given style, for assignment of a relative width value to each selected character. Additional apparatus inclues a number of similarly selectable multiple-circuit elements, or cards, each representing a given set width, for automatic selection of the product of each relative width value and the corresponding set width.

While a preferred embodiment of the invention has been described, it may be modified in conformity with present knowledge in the art to suit particular applications, as will be readily appreciated. Also, it will be apparent that the multiple-circuit elements are represented in the drawings as cards of a specific construction; but other equivalent forms and structures will occur to the skilled artisan, and are intended to be included within the scope of the invention.

What we claim is:

1. A keyboard operated tape perforator for composing type characters that vary in set width on a relative width value basis comprising, in combination, a plurality of width card elements, each representing a particular assignment of width value to the characters of the keyboard according to a given typographical font and each comprising an electrical insulating board, a plurality of electrical conductors mounted on said board, one for each character of the keyboard, and a plurality of electrical conducting bars also mounted on said board, one for each possible unit width assigned to the keyboard characters, and means for connecting each electrical conductor to a conducting bar having an assigned width value corresponding to that of the character associated with said electrical conductor, a stationary holder in which the width card elements are mounted, input circuitry responsive to keyboard operation and connected to the electrical conductors of all of the width card elements, a font selector for activating any desired one of the width card elements to the exclusion of the others, and output circuitry connected to the electrical conducting bars of all of the width card elements and governing the operation of mechanism subject to keyboard control according to the width card element activated.

2. A combination according to claim 1, wherein the stationary holder is formed with a plurality of separate compartments, one for each width card element, and wherein said width card elements are mounted in their respective compartments for individual removal and replacement by other width card elements representing different assignments of character width values.

3. A combination according to claim 2, wherein the compartments of the stationary holder are formed of electrical insulating material and are provided with a set of electrical contactors forming part of the input circuitry and making contact with the electrical conductors of the width card elements and with another set of electrical contactors forming part of the output circuitry and which make contact with the electrical conducting bars of the width card elements.

4. A combination according to claim 1, wherein the electrical conductors are located on one side of the electrical insulating board while the electrical conducting bars are located on the opposite side of said board, and wherein the means for connecting the conductors and conducting bars are in the form of electrical connections passing through the insulating board.

References Cited
UNITED STATES PATENTS

| | | | |
|---|---|---|---|
| 2,487,373 | 11/1949 | Reppert | 234—5 |
| 2,746,680 | 5/1956 | Maul | 234—5 |
| 2,848,049 | 8/1958 | Robbins et al. | 234—5 |
| 3,061,182 | 10/1962 | Corrado et al. | 234—5 |

GERALD A. DOST, *Primary Examiner.*